United States Patent [19]
Gutermuth et al.

[11] 3,984,505
[45] Oct. 5, 1976

[54] FALSE KITCHEN CEILING WITH LIQUID SPRAY SYSTEM FOR CLEANING

[76] Inventors: Paul Gutermuth, Augustastrasse 48, D-6456 Langenselbold; Heinrich Oetjen, August-Bebel-Strasse 11, D-6451 Bruchkobel, both of Germany

[22] Filed: Mar. 19, 1975

[21] Appl. No.: 560,001

[30] Foreign Application Priority Data
Mar. 26, 1974 Germany............................ 2414573

[52] U.S. Cl................................ 261/111; 261/112; 55/241; 55/DIG. 36; 98/115 K
[51] Int. Cl.²...................... B01D 47/06; F23J 11/02
[58] Field of Search............... 55/DIG. 36, 241, 242; 98/115 R, 115 K, 115 SB; 261/111, 112, 29, 3, 5

[56] References Cited
UNITED STATES PATENTS

| | | | |
|---|---|---|---|
| 1,223,809 | 4/1917 | Lillibridge | 98/115 SB |
| 1,776,991 | 9/1930 | Biette | 98/115 K |
| 2,906,511 | 9/1959 | Umbricht et al. | 261/112 |
| 3,221,635 | 12/1965 | Hill, Jr. | 55/DIG. 36 |
| 3,410,195 | 11/1968 | King | 98/115 K |
| 3,430,551 | 3/1969 | Hauville | 98/115 R |
| 3,459,115 | 8/1969 | Gutermuth | 55/DIG. 36 |
| 3,561,735 | 2/1971 | Smith | 261/34 R |
| 3,628,311 | 12/1971 | Costarella | 98/115 K |
| 3,786,739 | 2/1974 | Wright | 98/115 K |
| 3,884,654 | 5/1975 | de Crevoisier et al. | 98/115 SB |

*Primary Examiner*—Tim R. Miles
*Assistant Examiner*—Gregory N. Clements
*Attorney, Agent, or Firm*—Sughrue, Rothwell, Mion, Zinn and Macpeak

[57] ABSTRACT

A false ceiling (10) includes a plurality of concave panels (12, 60) having liquid spray nozzles (40, 62) at their crowns. The liquid streams down the undersides of the panels to collecting channels (16) and carries with it particles of dirt, grease, etc., entrained in vapors from kitchen burners or the like below. Air is exhausted through the spaced openings between the edges (14) of the panels and the sides (18) of the collecting channels.

13 Claims, 4 Drawing Figures

FALSE KITCHEN CEILING WITH LIQUID SPRAY SYSTEM FOR CLEANING

BACKGROUND OF THE INVENTION

1. Field of the Invention

This invention relates to false ceilings for protecting supporting ceilings of industrial kitchens, slaughter houses, laundries and the like, against rising vaporous clouds and the precipitation of particles contained therein, and consists of ceiling elements whose surfaces are inclined in the direction of collecting channels above which eduction ports are arranged.

2. Description of the Prior Art

False ceilings are known in the art which prevent vaporous clouds caused by cooking processes as well as particles trapped in these vaporous clouds from producing ugly and unsanitary deposits on the supporting ceilings. One such known false ceiling comprises a surface promoting the formation of condensed water, on which moisture and the entrained particle settle. By condensation of the moisture, water drops are formed at the surface of the false ceiling, which flow into a collecting channel. The condensed water is continually carried off.

The substances or particles entrained by the vaporous clouds, moving upward due to hot currents of air, e.g., when frying, to a great extent also settle on the surface of the ceiling elements and are carried along by the water drops so developed. Some substances, especially fat deposited on the surface, however, are rather sticking. More substantial fat particles can also be caught in the gaps between the lower flanges of the ceiling elements and the walls of the collecting channels. Thereby the discharge of the condensed water is obstructed. The false ceiling must therefore by periodically cleaned.

SUMMARY OF THE INVENTION

It is an object of this invention to develop a false ceiling of the kind mentioned above in which continuous automatic cleaning is achieved together with an essentially improved separation of filtration of dirt particles. Air quantities of different extent can be exhausted at any place in the ceiling, and the risk of fire caused by fat and grease particles adhering to the false ceiling is greatly reduced.

According to the invention, the false ceiling elements are arranged between collecting channels and can be coated with a liquid film by spraying a liquid emitted by one or several spraying elements onto the lower and/or upper surfaces of the ceilings elements. Retaining plates mountable in grooves are provided in the cruciform and T-shaped pieces which join the collecting channels together.

With this arrangement, rising and sucked up media like vapors, smoke, etc., and the dirt particles contained therein strike the surface of the lower ceiling sprayed with the liquid, are bound by the liquid, and together with the latter are moved into the collecting channels. Thus, the separation of the dirt particles will be promoted and the risk of fire lessened.

An essential advantage of the device is that no fatty or other sticking particles can firmly settle on the surfaces of the ceiling elements of the lower or false ceiling. Thus, dirt accumulation on the surface of the ceiling elements is largely avoided.

In one embodiment the ceiling elements are barrel-shapedly arched, or longitudinally concave, and spray nozzles are arranged within the barrellings in the longitudinally direction of the ceiling elements. The length of the ceiling elements can be easily adapted to the corresponding dimensions of the room intended for the installation of the false ceiling.

In another embodiment the ceiling elements are cross-archedly configured. A spray nozzle is arranged within the barrelling of each ceiling element, and the collecting channels at the lower edges of the ceiling elements are arranged on the same level and at the crossing points are joined with each other on the same level. This lower ceiling is composed of individual ceiling elements cross-archedly configured pursuant to the unit-composed system. This arrangement facilitates adaption to rooms of different sizes. The continuous supply of spray liquid likewise maintains a sufficient streaming speed in the collecting channels arranged on the same level, through which in addition to condensed water, other particles, too, are transported to a down pipe. By arranging the collecting channels on the same level, this embodiment has the further advantage that complicated and time-consuming measures to adjust and adapt the slope of numerous collecting channels are not required. Therefore, even in long rooms with rather low ceilings there will be not undesired low collecting channels at certain places.

In this embodiment, the liquid level is controlled at the crossing-points by inserting retaining plates. By using retaining plates of different height between the individual crossing-points, the liquid levels can be differently adjusted. Hereby the free section for sucking off air is changed and thus, with the corresponding resistance, the air quantity is also changed.

This arrangement has the advantage that the fat particles entrained by the liquid cannot settle on the walls of the collecting channels. Thus the risk of dirt accumulation in the collecting channels is thereby lessened.

If the level of the stemmed-up liquid in the collecting channels is raised to such an extent that the free section for sucking off the air at a static liquid level is not available anymore, then undulations in the liquid are generated by the low pressure between the false ceiling and the supporting ceiling. By this arrangement, particles still contained in the sucked-up air are bound by the liquid and carried off expeditiously.

Preferably a non-flammable liquid is used to lessen the risk of fire in rooms where high temperatures are generated by equipment installed therein.

DESCRIPTION OF THE PREFERRED EMBODIMENT

Figure 1:
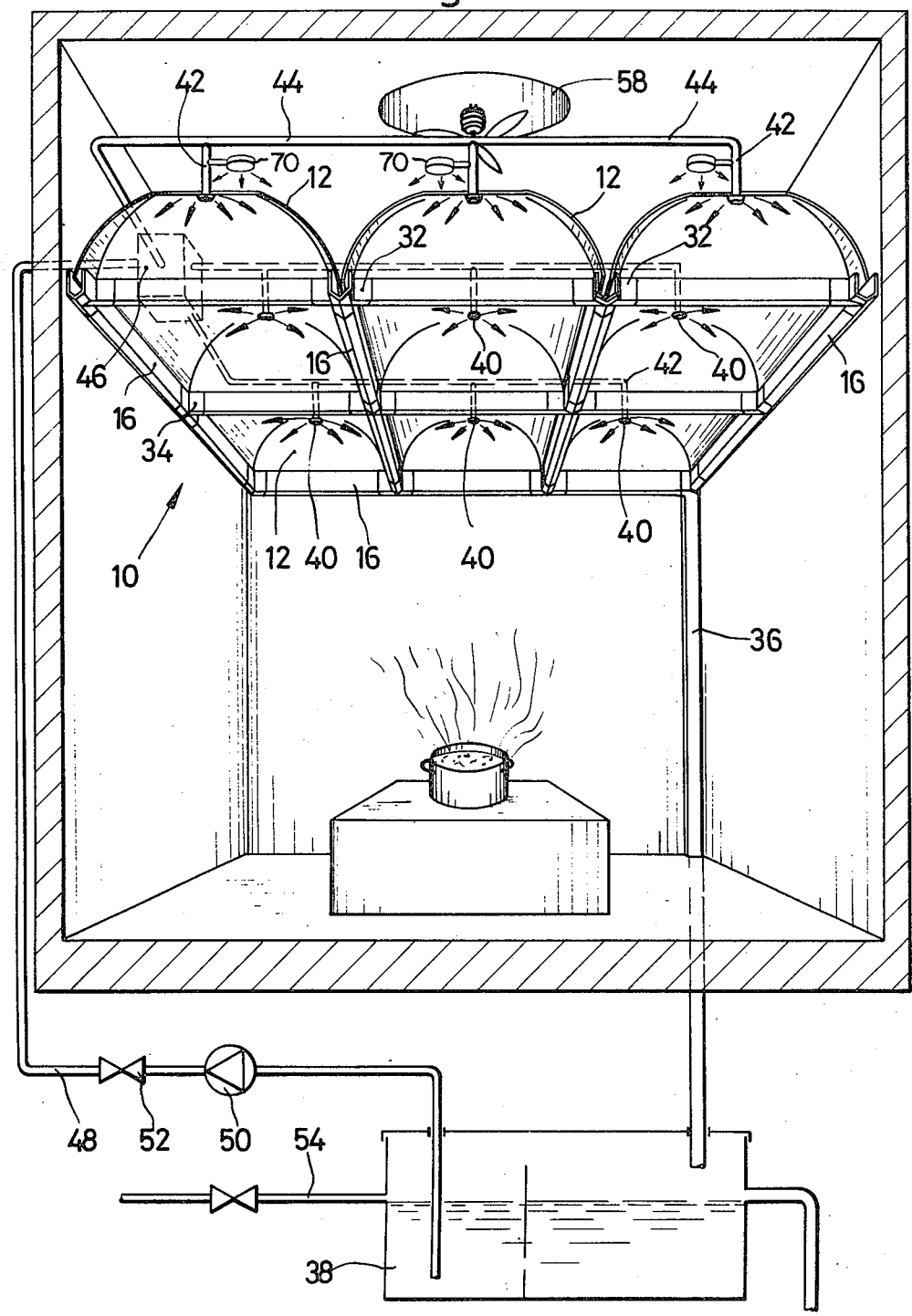
FIG. 1 shows a perspective view of a room with a false ceiling according to the invention, partially cut-away.
Figure 2:
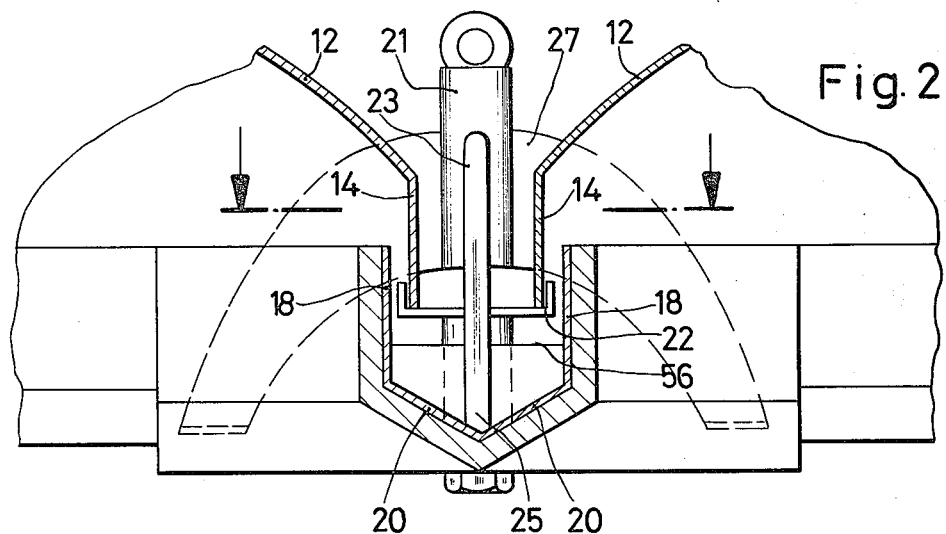
FIG. 2 shows a sectional view of a cruciform joint and the adjacent sections of two ceiling elements.
Figure 3:
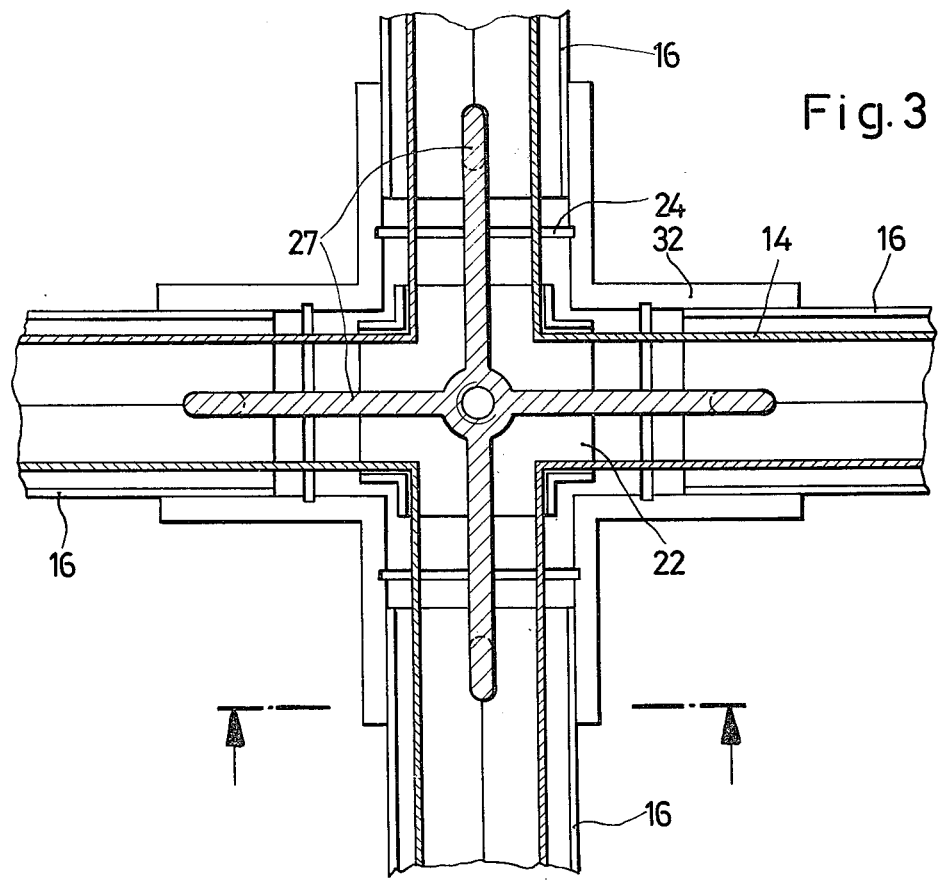
FIG. 3 shows a partial sectional view of the cruciform joint according to FIG. 2 in top view.

In an industrial kitchen there is a false or lower ceiling 10 underneath the supporting ceiling, composed of individual ceiling elements 12 made of thin-walled material. The ceiling elements 12 are provided with a cross-archlike barrelling whose open edges are of equal length. In this example, each ceiling element 12 thus occupies a square on a plane running parallel to the ground of the room. The ceiling elements 12 are arranged side by side on the same level.

The lateral extremities 14 of the ceiling elements 12 extend into collecting channels 16 whose openings point upward. The collecting channels 16 consist of two parallel lateral walls 18 joined with each other at one extremity by gibs 20 to form a longitudinal channel of generally V-shaped section.

The extremities 14 of the ceiling elements 12 are received by a cruciform lodging piece 22 dimensional according to the distance between the walls 18 and the gibs 20 of the collecting channels. The distance between the adjacent extremities 14 of the ceiling elements 12 is fixed by the lodging piece 22 and an opening of predetermined size is left open.

The collecting channels 16 are arranged underneath the ceiling elements 12 along the extremities 14. Crossing points of collecting channels 16 are thus formed at the corners of the ceiling elements 12, running in a vertical direction with respect to each other. Cruciform joining pieces 32 and T-shaped joining pieces 34 can be provided, by means of which the collecting channels 16 are joined at the crossing or abutting points.

The ceiling elements 12 are suspended from the supporting ceiling. For this purpose, a suspension piece 21 is provided being fastened at the supporting ceiling and having a bore 23. At an abutting point, four ceiling elements 12 are received at their lateral extremities 14 by a cruciform lodging piece 22. A cruciform joining piece 32 is pressed against the collecting channels 16 from below, this joining piece being provided with a bore through which a plug 25, a long screw or another fastening means can be passed, projecting into the bore of the suspension piece 21 and brought into engagement therewith. From above, a cruciform element 27 with four archlike legs presses against the collecting channels 16. The element 27 is fastened at the suspension piece 21. By the adjustable engagement of the plug 25 or the like with the suspension piece 21, the pressing force of the joining piece 32 against the collecting channels 16 is adjusted.

The collecting channels 16, with their joining pieces 32, 34, are arranged at the same distance from the floor. At its one end, a collecting channel 16 is connected with a down pipe 36, running vertically in one corner of the room and ending in a collecting tank 38, put up outside of or within the room.

Within the barrelling of each ceiling element 12, a spray nozzle 40 is arranged, connected with a distributing manifold 44 via a conduit 42, to which pressure-fed liquid is supplied by a distributed box 46. Via a feed line 48 the pressure-fed liquid is supplied to the distributing box 46, whereby a pump 50 and a stop valve 52 are arranged within the feed line 48. The feed line starts from the collecting tank 38.

The spray nozzle 40 has aperture not shown in detail, being directed in such a way that the liquid emanating from the nozzle will be sprayed against the barrelling of the respective ceiling element 12. The continuously sprayed liquid reaches the surfaces of the ceiling elements 12 and settles thereon in the form of a thin liquid film. The ceiling surfaces of the elements 12 extending between the collecting channels 16 are thus coated with a liquid film, from which the liquid flows off into the collecting channels 16. Preferably the spray nozzles 40 are arranged immediately beneath the ceiling elements 12, however, they can also be mounted a certain distance therefrom.

In the cruciform joining pieces 32 and T-shaped joining pieces 34 there are arranged retaining plates 24, by means of which a certain quantity of liquid is retained in the collecting channels 16. The level of the liquid 56 retained in the collecting channels 16 is on a level with the upper edge of the retaining plate 24. There will be sufficient space between the extremities 14 and the wall 18, as well as between the lower edges of the extremities 14 being supported by the cruciform lodging piece 22, and the liquid level 56 in order that the vapor from the room can reach the openings between the adjacent extremities 14. This vapor escapes via a ceiling opening 58. The eduction is intensified by an exhaust fan.

Vaporous clouds rising from cooking facilities, particles entrained by the vaporous clouds, as well as vapors generated by a strong heating of fats or oils, arrive at the barrellings of the ceiling elements 12 on the liquid film generated by the spray nozzles 40. The sucked up vapors, the flow of which is toward the ceiling elements 12, reach the surface of the ceiling elements 12 and thus the liquid film.

Therefore, the substances and the water vapor are quickly transported to the surface and settle on the liquid film coating the ceiling surfaces. The streaming film prevents the particles from settling on the surfaces of the ceiling elements 12 and from sticking thereon. Due to the streaming of the liquid film and by reason of their weight, the particles flow along the barrelling to the extremities 14, from which they drop into the collecting channel 16. In the channels 16 the particles flow to the down pipe 36, from which they are moved into the collecting tank 38. In the collecting tank 38 there are filters and traps in which the particles are retained while the cleaned liquid is again fed to the feed line 48 via the pump 50.

By the spraying process, the separation of water vapor and of the particles being whirled against the ceiling is therefore accelerated. Furthermore, an automatic cleaning of the surfaces results from the water film on the surfaces of the ceiling elements 12. Therefore, the surfaces will not be contaminated by sticking fat particles. In the collecting channels 16, the fat particles float on top of the dammed water and thus cannot settle on the walls. Therefore, a choking of the outlet troughs is largely prevented.

The distance between the edges at the extremities 14 and the liquid level 56 is dimensioned so small that the liquid film on the surfaces of the ceiling elements sometimes passes over to the liquid in the collecting channels 16. When this happens, the gaps between the extremities 14 and the walls 18 are sealed. In the space above the ceiling elements 12 a low pressure is therefore developed, which causes the exposure of the apertures. This process is repeated. Thereby undulations of the liquid in the collecting channel 16 are produced. Due to these undulations, any particles sucked up by the air but not bound by the liquid film on the ceiling elements 12, are absorbed by the liquid at this place. Substances are thereby prevented from settling on the extremities 14 and on the walls 18.

Furthermore, the undulations of the water film promote the removal of the particles. By joining the ceiling elements 12, the lower ceiling 10 can be easily and quickly assembled according to the respective room dimensions.

Figure 4:
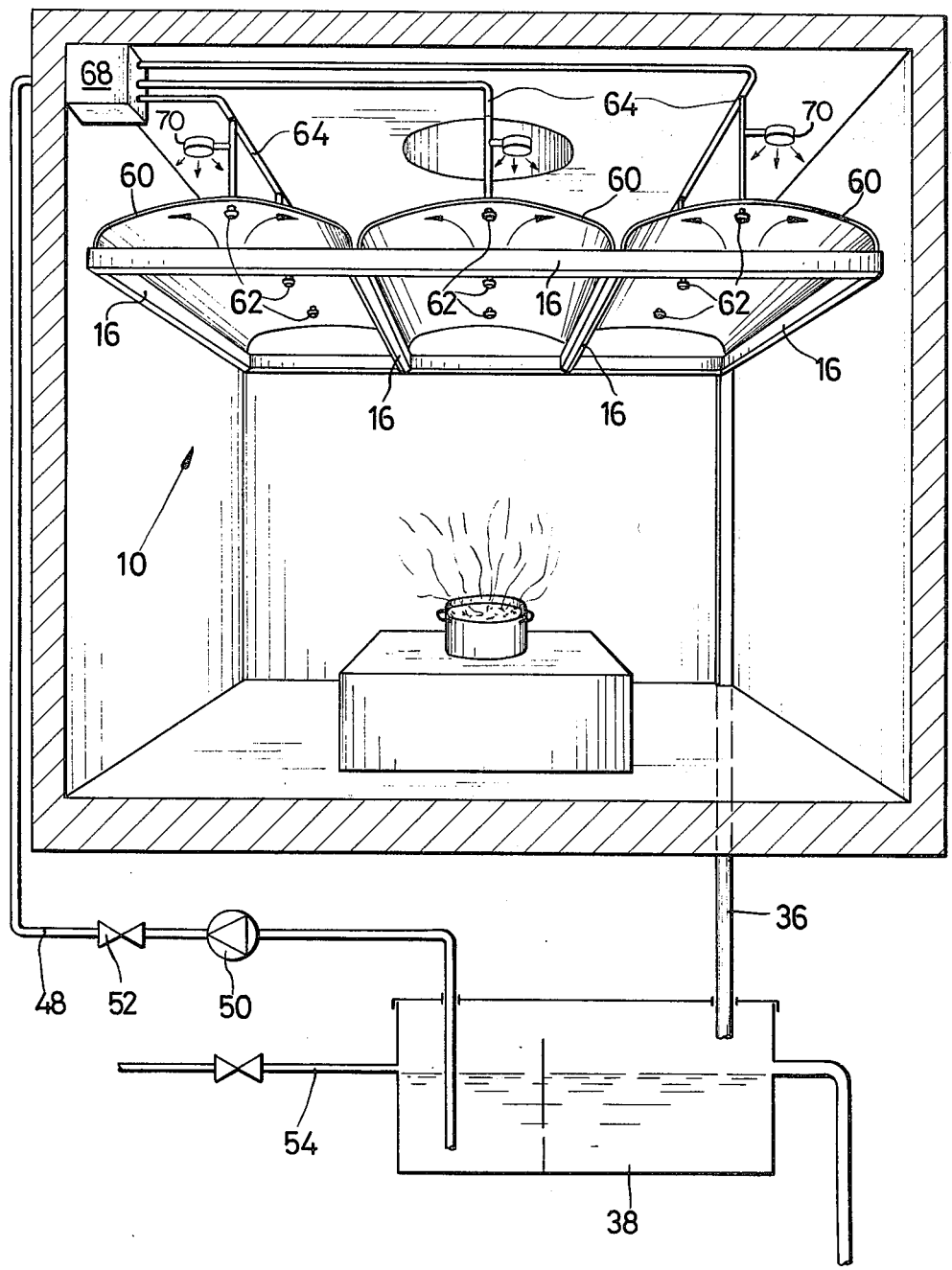
FIG. 4 shows a perspective view of a room with a false ceiling according to another embodiment.

In FIG. 4 a false ceiling 10 is shown consisting of barrel-shaped arched ceiling elements 60 arranged side by side. The extremities of the ceiling elements extend into the collecting channels 16, one of which is connected with the down pipe 36. In the longitudinal direction of the barrellings spray nozzles 62 are arranged, each row being connected with a main line 64, to which pressure-fed liquid is supplied by a distribution box 68. The cycle for the generation of pressure and recovery and filtration of the liquid of the arrangement shown in FIG. 4 is the same as for FIG. 1.

By spraying liquid onto the surfaces of the ceiling elements 60, the spray nozzles 62 produce a liquid film which prevents the particles from sticking on the surfaces and facilitate the transport of the particles to the collecting channels. By this liquid film on the surfaces of the ceiling elements 60, the same advantages are achieved as described above in connection with the arrangement according to FIG. 1.

By the continuous supply of sprayed liquid, a sufficient streaming speed is produced in the collecting channels 16, being arranged on the same plane and on the same height, by means of which in addition to condensed water, other particles are also speedily transported to the down pipe 36. Since the channels 16 are arranged on the same level complicated and time-consuming adjusting works for a fall or slope are not required. The lower ceiling 10 can be mounted in long rooms of low ceiling height without having to run the collecting channels 16 undesirably low at certain places to provide a slope.

It is also possible to arrange spray nozzles 70 above the ceiling elements 12, 60 so that the ceiling elements can be sprayed from above. Therefore, the deposit of particles on the upper surfaces of the ceiling elements 12, 60 can also be prevented. Since the air flowing upward is freed of these particles to a great extent while passing through the barrelling of the ceiling elements 12, 60, it is generally optional to also spray the ceiling elements 12, 60 from above.

The liquid is chiefly sprayed against the middle portions of the barrellings of the ceiling elements 12, 60. Since a closed circulation system for the air in the room may be provided, the thermal energy accumulated in the room air may be largely retained so that contrary to rooms with continuous supply of fresh-air to be heated, the requirement for energy to keep up the room temperature is rather small.

What is claimed is:

1. A false ceiling for protecting supporting ceilings of industrial kitchens, slaughter houses, laundries and the like, against rising vaporous clouds and precipitation of particles contained therein, comprising adjacent ceiling panels having inclined lower surfaces, collecting channels positioned below the lower edges of said ceiling panels, an exhaust port positioned above said ceiling panels to remove vapors thereabove, spray nozzles for supplying liquid films to said lower surfaces, cruciform and T-shaped pieces with grooves therein mountingly receiving ends of said collecting channels, and liquid retaining plates mounted in said grooves adjacent the ends of said collecting channels.

2. A false ceiling according to claim 1, wherein the ceiling panels (60) are longitudinally concave, and said spray nozzles (62) are mounted in the tops of the panels in a longitudinal direction.

3. A false ceiling according to claim 1, wherein the ceiling panels (12) are configured as crossed arches, said spray nozzles (40) are individually mounted within the crown of each ceiling panel, and the collecting channels (16) at the lower edges (14) of the ceiling panels (12) are arranged on the same level and are joined with each other at the crossing-points on the same level.

4. A false ceiling according to claim 1, wherein the retaining plates (24) within different cruciform joining pieces (32) and T-shaped joining pieces (34) have different heights, whereby liquid can be banked at different levels.

5. A false ceiling according to claim 1, wherein the distance between the lower edge of the extremities (14) of the ceiling panels (12) and the liquid level (56) is kept so small that undulations of the liquid level (56) are generated by the intermittent closing of the openings between the lower edge of the extremities (14) and the liquid level (56) due to the low pressure above the false ceiling (10).

6. A false ceiling according to claim 1, wherein the upper edges of the retaining plates (24) end on the same level as the lower edges of the ceiling panels (12).

7. A false ceiling according to claim 1, wherein the retaining plates (24) project from the lower edges of the ceiling panels (12).

8. A false ceiling according to claim 1, wherein water is the sprayed liquid.

9. A false ceiling according to claim 1, further comprising a suspending piece (21) with a bore (23) fastened on the supporting ceiling at a crossing-point of at least two ceiling panels (12) to mount the false ceiling (10).

10. A false ceiling according to claim 1, further comprising a cruciform lodging piece (22) for receiving the extremities (14) of ceiling panels (12), said lodging piece having an opening through which a plug (25) can be passed.

11. A false ceiling according to claim 1, further comprising a cruciform element (27) with arc-shaped legs fastened on a suspending piece (21) and pressing from above against the collecting channels (16) at the joining places of the ceiling panels (12).

12. A false ceiling according to claim 1, further comprising a cruciform joining piece (32) pressed against the collecting channels (16) from below and having a bore through which a plug (25) is passed for engagement with the bore (23) of the suspending piece (21).

13. A false ceiling according to claim 1 further comprising nozzle means for spraying liquid on the upper surfaces of the ceiling panels.

* * * * *